(12) United States Patent
Florence et al.

(10) Patent No.: US 8,711,954 B2
(45) Date of Patent: Apr. 29, 2014

(54) TRANSFER OF DIGITAL DATA THROUGH AN ISOLATION

(75) Inventors: Arnaud Florence, St Antoine du Rocher (FR); Jerome Heurtier, Tours (FR)

(73) Assignee: STMicroelectronics S.A., Montrouge (FR)

( * ) Notice: Subject to any disclaimer, the term of this patent is extended or adjusted under 35 U.S.C. 154(b) by 1387 days.

(21) Appl. No.: 11/966,004

(22) Filed: Dec. 28, 2007

(65) Prior Publication Data

US 2008/0159360 A1    Jul. 3, 2008

(30) Foreign Application Priority Data

Dec. 28, 2006  (FR) ...................................... 06 56034

(51) Int. Cl.
*H04B 3/00* (2006.01)
(52) U.S. Cl.
USPC ........... 375/258; 375/286; 375/257; 375/220; 375/211
(58) Field of Classification Search
USPC ....................................................... 375/211
See application file for complete search history.

(56) References Cited

U.S. PATENT DOCUMENTS

| 4,937,468 A | | 6/1990 | Shekhawat et al. | |
|---|---|---|---|---|
| 5,172,240 A | * | 12/1992 | Nakazato | 386/201 |
| 5,533,056 A | * | 7/1996 | Cripps | 375/286 |
| 2008/0056411 A1 | * | 3/2008 | Flachs et al. | 375/340 |

FOREIGN PATENT DOCUMENTS

| EP | 0 749 227 A2 | 12/1996 |
|---|---|---|
| JP | 61-260744 | 11/1986 |

OTHER PUBLICATIONS

French Search Report from corresponding French Application No. FR 06/56034, filed Dec. 28, 2006.

* cited by examiner

*Primary Examiner* — Lihong Yu
(74) *Attorney, Agent, or Firm* — Wolf, Greenfield & Sacks, P.C.

(57) ABSTRACT

A method and a system for transferring a digital signal through a transformer, in which the current in a primary winding of the transformer is a frequency-modulated signal exhibiting sinusoidal trains of different durations according to the rising or falling edge of the digital signal to be transferred.

10 Claims, 4 Drawing Sheets

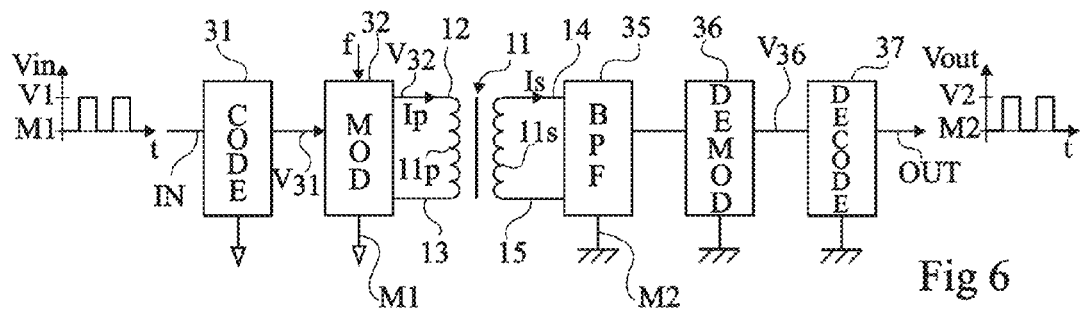
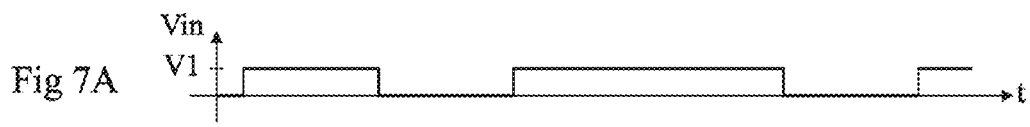
Fig 7A
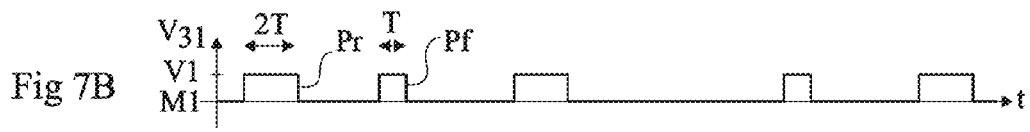
Fig 7B
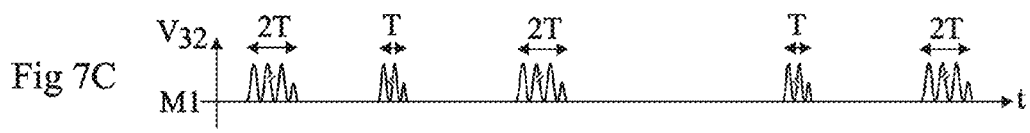
Fig 7C
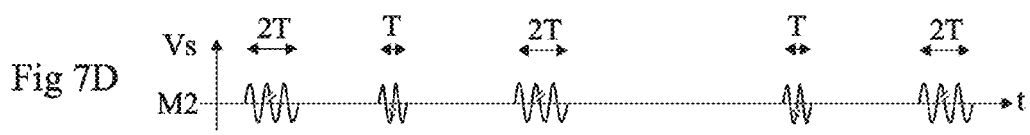
Fig 7D
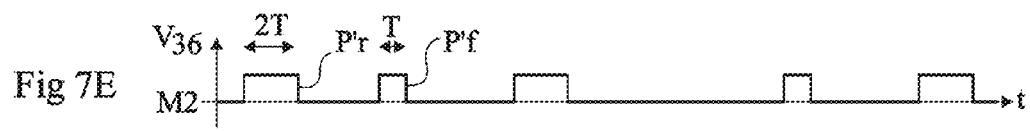
Fig 7E
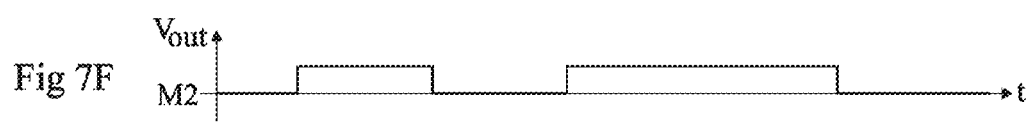
Fig 7F

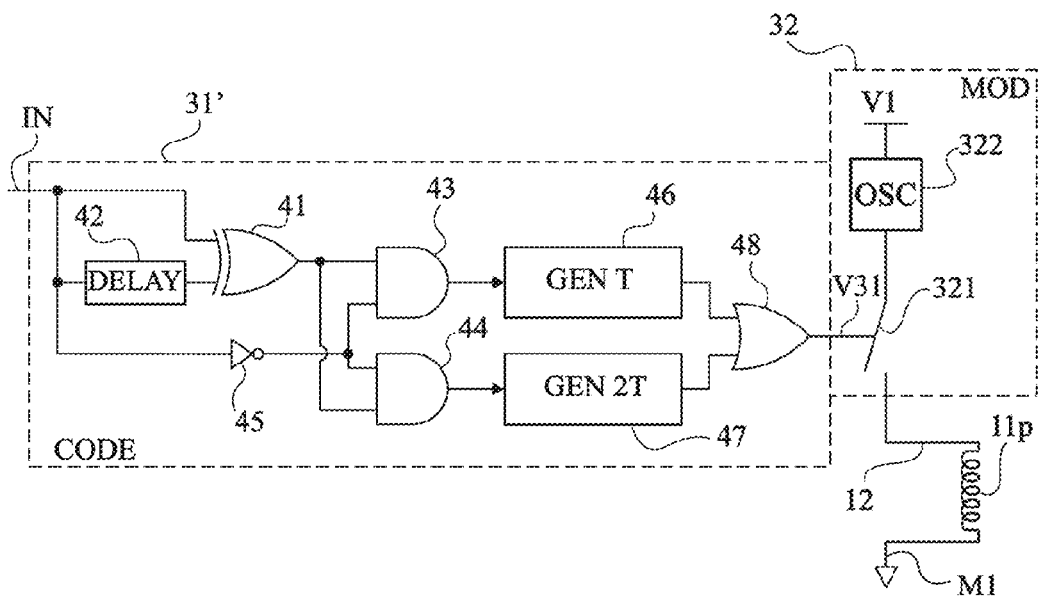
Fig 10
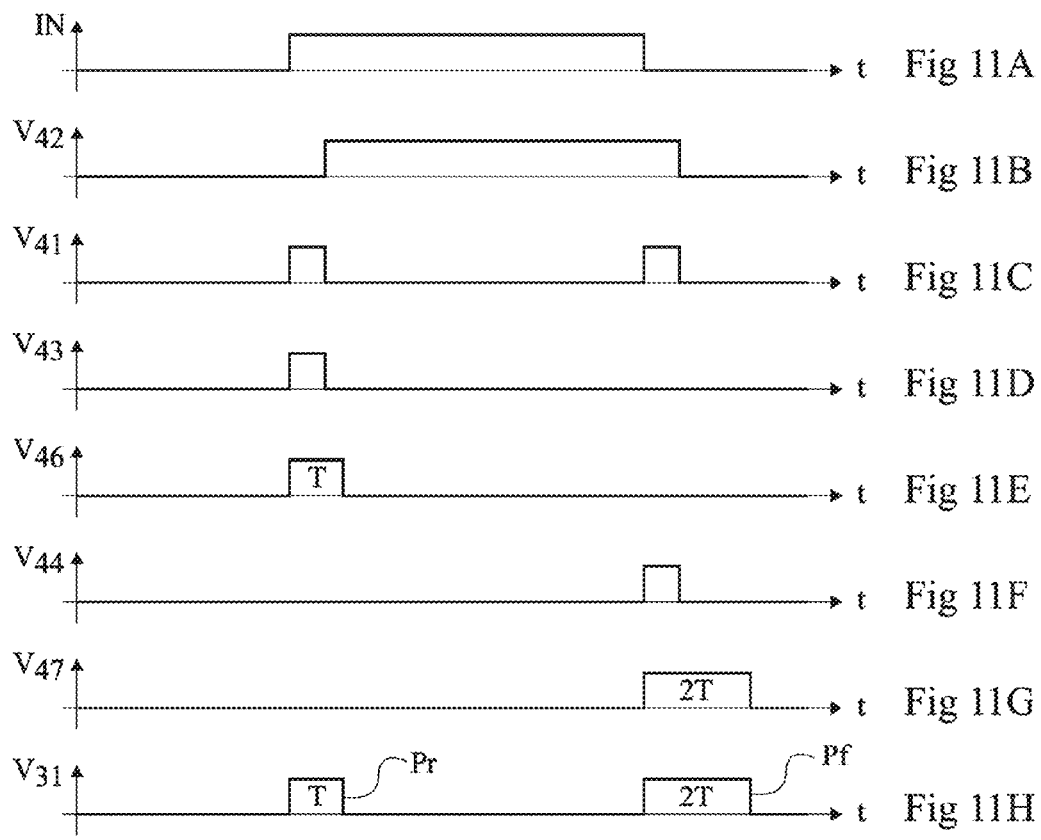

TRANSFER OF DIGITAL DATA THROUGH AN ISOLATION

BACKGROUND OF THE INVENTION

1. Field of the Invention

The present invention generally relates to galvanic isolation barriers and, more specifically, to the transmission of digital signals through an isolation barrier. The present invention more specifically applies to a transformer-based isolation.

2. Discussion of the Related Art

To obtain galvanic isolation, optocouplers, capacitive couplers, or transformers are generally used.

The use of a single transformer directly driven by the digital signal to be transmitted generates significant power consumption since, on the primary side, the transformer is supplied during all positive square pulses. A solution is to use two transformers to separately transmit the rising and falling edges, which increases the bulk and the cost.

SUMMARY OF THE INVENTION

An embodiment of the present invention aims at overcoming all or part of the disadvantages of known transformers for transferring digital signals through an isolation barrier.

An embodiment of the invention requires only a single transformer.

An embodiment of the invention has a wide passband.

An embodiment of the invention provides good immunity to noise.

An embodiment of the invention, the present invention provides a method for transferring a digital signal through a transformer, in which the current in a primary winding of the transformer is a frequency-modulated signal exhibiting sinusoidal trains of different durations according to the rising or falling edge of the digital signal to be transferred.

According to an embodiment, the digital signal to be transferred is coded to generate pulses of different durations according to the rising or falling edge of the signal.

According to an embodiment, the period of the modulation carrier is selected to be shorter than the minimum duration of a pulse.

According to an embodiment, a signal of sinusoidal trains recovered on the secondary side of the transformer is demodulated to recover the envelope of the signal comprising pulses of different durations, the demodulated signal being decoded to restore the digital signal.

According to an embodiment, the signal recovered on the secondary side of the transformer is filtered by means of a low-pass filter before demodulation.

According to an embodiment:

a rising edge of the digital signal is converted into a first pulse of a first duration and a falling edge of the digital signal is converted into a second pulse of a second duration, different from the first one;

the pulses are frequency-modulated with a carrier having a period shorter than the minimum duration of a pulse; and the frequency-modulated signal is applied to the primary winding of the transformer.

According to an embodiment:

a signal sampled from the secondary of the transformer is demodulated to recover the pulse envelope; and the demodulated signal is decoded to restore a digital signal by interpreting the respective durations of the pulses restored by the demodulation.

According to an embodiment, the signal sampled from the secondary of the transformer is, before demodulation, filtered by means of a band-pass filter having a passband including the modulation frequency.

Another object is a system for transferring a digital signal through a transformer, comprising:

an input circuit comprising at least an encoder and a modulator of the digital signal to be transferred, having its output connected to a primary winding of the transformer; and an output circuit comprising at least a demodulator and a decoder of the signal recovered across a secondary winding of the transformer.

According to an embodiment, the input circuit comprises:

an encoder generating a first type of pulses on each rising edge of the digital signal to be transferred, these pulses being of a first duration, and a second type of pulses of a duration different from the first one on each falling edge of the digital signal; and a modulator of the signals provided by the encoder, with a carrier having a period shorter than the minimum duration of a pulse generated by the encoder.

According to an embodiment, the output circuit comprises at least:

a demodulator; and a decoder generating a rising edge in the presence of a pulse of a first duration and a falling edge in the presence of a pulse of a second duration, different from the first one.

According to an embodiment, the output circuit further comprises, upstream of the demodulator, a band-pass filter having its passband selected to include the frequency of the carrier of the input circuit modulator.

The foregoing and other objects, features, and advantages of the present invention will be discussed in detail in the following non-limiting description of specific embodiments in connection with the accompanying drawings.

BRIEF DESCRIPTION OF THE DRAWINGS

FIG. 6 very schematically shows in the form of blocks an embodiment of a transfer system according to the present invention;

FIGS. 7A, 7B, 7C, 7D, 7E and 7F illustrate, in timing diagrams, the operation of the system shown in FIG. 6;

FIG. 10 shows another example of an input circuit of the system of FIG. 6; and

FIGS. 11A, 11B, 11C, 11D, 11E, 11F, 11G and 11H are timing diagrams illustrating the operation of the input circuit of FIG. 10.

DETAILED DESCRIPTION

Figure 1:
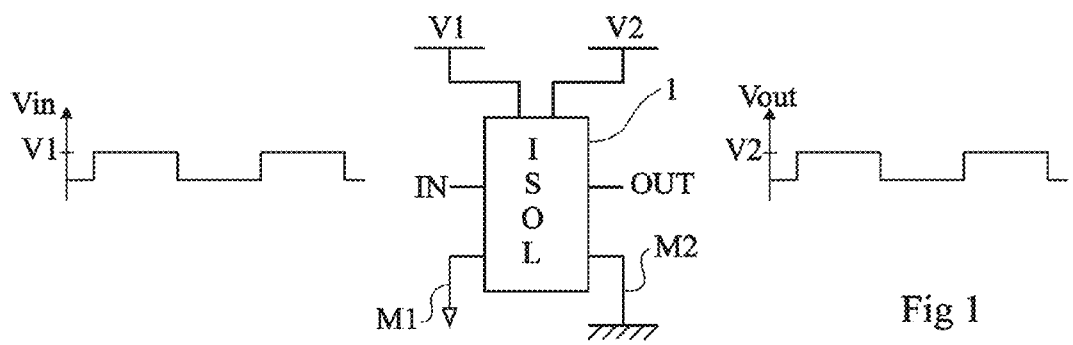
FIG. 1 is a block diagram of an example of an isolation system to which an embodiment of the present invention applies.

The same elements have been designated with the same reference numerals in the different drawings, which have not been drawn to scale.

For clarity, only those elements useful to the understanding of the present invention have been shown and will be described. In particular, the upstream and downstream circuits of the isolation barrier of the present invention, for generating the digital signals and exploiting said signals, have not been detailed, the present invention being compatible with any conventional system needing to have a digital signal transit through an isolation barrier.

FIG. 1 very schematically shows in the form of blocks an example of an isolation system or isolator 1 (ISOL). This isolator receives, on an input terminal IN, a digital signal Vin having as an amplitude a first voltage V1 referenced with respect to a first ground M1. The isolator provides, on an output terminal OUT, a digital signal Vout having as an amplitude a second voltage V2 referenced with respect to a second ground M2. Amplitudes V1 and V2 may be different or identical.

Figure 2:
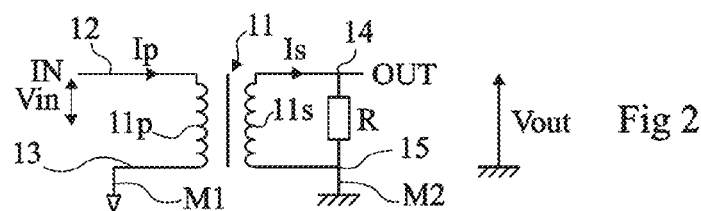
FIG. 2 shows an example of a diagram of an isolation transformer.

FIG. 2 shows an example of a usual diagram of a transformer 11. A primary winding 11p of the transformer receives, on a first end 12, signal Vin to be converted and has its second end 13 connected to ground M1. A secondary winding 11s of the transformer has a first end 14 defining terminal OUT while a second end 15 is connected to ground M2. A current-to-voltage conversion resistor R, across which signal Vout is sampled, connects output terminals 14 and 15.

Figure 3A:
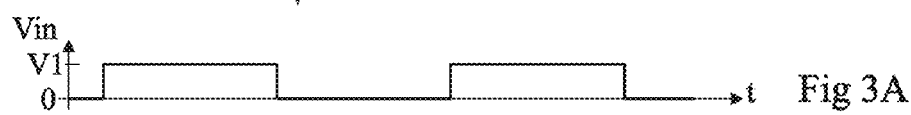
FIGS. 3A, 3B, and 3C illustrate the operation of the transformer of FIG. 2.
Figure 3B:
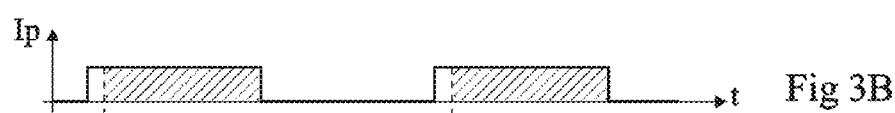
Figure 3C:
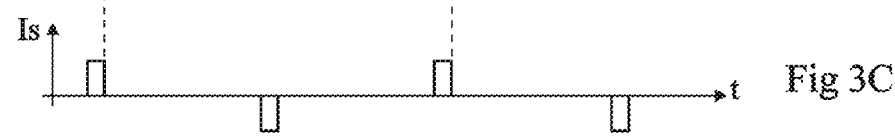

FIGS. 3A, 3B, and 3C illustrate the operation of the transformer of FIG. 2 for the transmission of a digital signal Vin (for example, a clock signal). FIG. 3A shows an example of shape of signal Vin. FIG. 3B illustrates the shape of current Ip in primary 11p of the transformer. FIG. 3C illustrates the shape of current Is in secondary 11s. The rising edges of signal Vin translate as pulses in a first direction (which are, for example, positive with the orientations taken in the drawings) on current Is. The falling edges translate as pulses in the reverse direction. For simplification, the pulses have been shown as non-noisy. In practice, their shape is less regular than the illustration. Based on current Is, an adapted decoder is capable of restoring the clock signal having crossed the isolation barrier.

The assembly of FIG. 2 generates significant power consumption. Indeed, on the primary side, the transformer is supplied during all positive square pulses while only the edges are exploited by the secondary. This useless power consumption is illustrated in FIG. 3B by hatchings.

Figure 4:
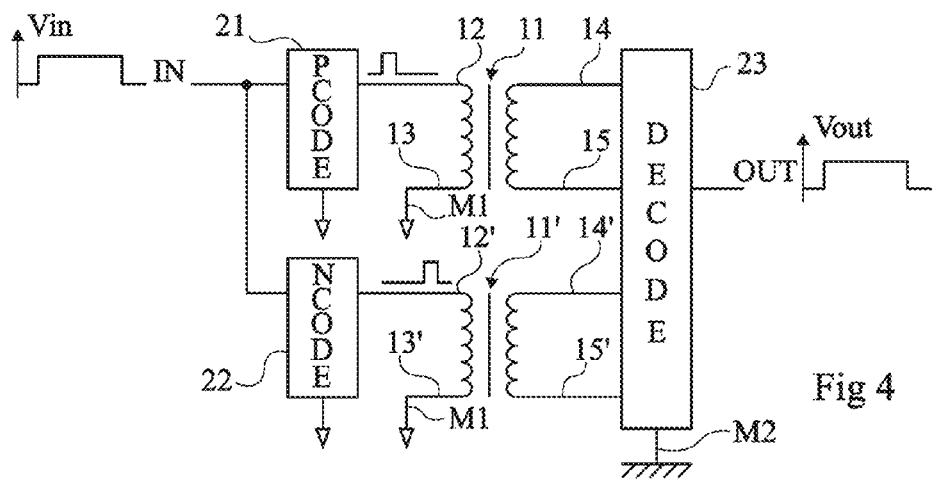
FIG. 4 is a block diagram of a usual isolation system.

FIG. 4 shows an example of a usual system with two transformers 11 and 11' which are respectively used to transmit rising and falling edges of input signal Vin. For this purpose, terminal IN of the isolator input is sent to the input of two coding circuits 21 (PCODE) and 22 (NCODE) respectively providing pulses on the rising and falling edges of signal Vin. The outputs of circuits 21 and 22 are connected to first respective ends 12 and 12' of the primaries of transformers 11 and 11', having their second respective ends 13 and 13' connected to ground M1. Respective ends 14, 15, and 14', 15' of the secondary windings of transformers 11 and 11' are connected to a decoding circuit 23 (DECODE) providing, on an output terminal OUT, signal Vout referenced to ground M2.

Figure 5:
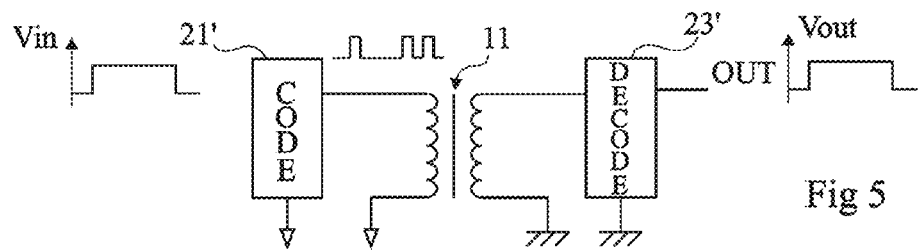
FIG. 5 is a block diagram of another usual isolation system.

FIG. 5 shows another example of a usual system.

According to this example, a circuit 21' (CODE) for coding the digital signal Vin to be processed provides, at primary 11p of a transformer 11, one pulse for the rising edges and a series of two close pulses for the falling edges. A decoding circuit 23' (DECODE) exploits, on the secondary side, the edges and edge pairs to restore signal Vout. The isolator of FIG. 5 requires, on the decoding side, a determined observation window to be able to make out the pulses of the rising edges from the pairs of pulses of the falling edges which translate, at the secondary, as pulses in the same direction. The frequency of the digital signal capable of being processed, and thus the system passband, is thus limited. Another disadvantage of this system is that it exhibits a poor immunity to noise due to the pulse transmission.

FIG. 6 is a block diagram of an embodiment of a system for transferring digital signals through an isolation barrier.

A terminal IN receiving a digital signal Vin to be transmitted downstream of the isolation barrier (transformer) is connected to the input of an encoder 31 (CODE) providing pulses of amplitude V1, referenced to a first ground (or reference voltage) M1, having a different duration according to whether signal Vin exhibits a rising edge or a falling edge. The output of circuit 31 is connected to the input of a modulator 32 (MOD) in charge of transforming the pulses into sinusoidal trains of different durations according to the received rising or falling edges. Modulator 32 receives or generates a carrier of frequency f, and provides the modulated signal on a first end 12 of a primary winding 11p of a transformer 11 having its second end referenced to ground M1.

Thus, the primary winding of transformer 11 is excited by sinusoidal trains having a duration depending on the edge direction of the digital signal to be transmitted.

On the secondary side 11s of the transformer, an optional band-pass filter 35 (BPF) has its input connected to a first end 14 of winding 11s having its second end 15 referenced to a second ground M2 corresponding to the reference voltage of band-pass filter 35. The passband of filter 35 is selected to include frequency f of the carrier of the transmitted signal. For simplification, the current-to-voltage conversion elements (for example, resistive) have not been illustrated in FIG. 6 between winding 11s and filter 35. The output of the band-pass filter is sent onto a demodulator 36 (DEMOD) in charge of recovering the envelope of the frequency-modulated signal. Output signal V36 of demodulator 36 is provided to a decoder 37 (DECODE) having the function of interpreting the respective durations of the demodulated envelope pulses to provide, on an output terminal OUT of the system, a digital signal Vout of amplitude V2 referenced to ground M2, reproducing digital input signal V1.

FIGS. 7A to 7F illustrate, in timing diagrams, the operation of the system of FIG. 6.

FIG. 7A shows an example of a digital signal Vin applied to the system input. In this arbitrary example, signal Vin is not a clock signal but a digital signal, for example, of data transmission.

FIG. 7B illustrates the shape of signal V31 provided by encoder 31 which, in this example, exhibits a pulse Pr of duration 2T and of amplitude V1 on each rising edge of signal Vin and a pulse Pf of duration T and of level V1 on each falling edge of signal Vin. To simplify the description, the voltage drops with respect to the respective supply voltages of the primary and of the secondary have been neglected, and the digital signals are considered as having the full amplitudes of these supply voltages. Similarly, the signal propagation times have been neglected.

The selection of a double duration for pulses Pr of the rising edges with respect to pulses Pf of the falling edges is an example only, any other ratio (smaller or greater than one) may be selected according to the decoding circuit used downstream of the system, provided for these pulse durations be different for the rising edges and for the falling edges.

FIG. 7C shows the shape of signal V32 provided by modulator 32 and sent onto primary 11p of transformer 11. For each pulse Pr of signal V31, modulator 32 provides a sinusoidal train of duration 2T while it provides a sinusoidal train of duration T for each pulse Pf. These pulses transit through the isolation barrier formed by transformer 11. The carrier may be of any kind, provided for its period to be shorter than the minimum period of the pulses.

FIG. 7D illustrates the shape of voltage Vs recovered on the secondary side 11s of transformer 11. Signal Vs comprises sinusoidal trains around ground M2 with different respective durations 2T and T, thus reproducing signal V32.

FIG. 7E shows the shape of signal V36 at the output of demodulator 36. This signal recovers the envelope of modulated signal Vs and thus reproduces the equivalent of signal V31 with different pulse durations P'r and P'f (respectively, 2T and T).

FIG. 7F shows the shape of signal Vout referenced to ground M2. Decoder 37 interprets the respective durations of pulses P'r and P'f to restore the sent digital signal. In FIG. 7F, a time shift has been illustrated between signal V36 and signal Vout. According to the structure of decoder 37, this time shift can enable waiting for at least a duration T to make out a pulse of duration T from a pulse of duration 2T.

An advantage of an embodiment of the present invention is that a single transformer is enough to form the galvanic isolation.

Another advantage is that the transmission of sinusoidal signals through the transformer provides a good immunity to noise.

Another advantage is that the decoding of the received signal exploits pulse durations and not, as in the conventional embodiment of FIG. 5, a number of pulses. This simplifies the decoder structure and allows for a more significant passband. For example, frequency f may be of several gigahertzes.

Figure 8:
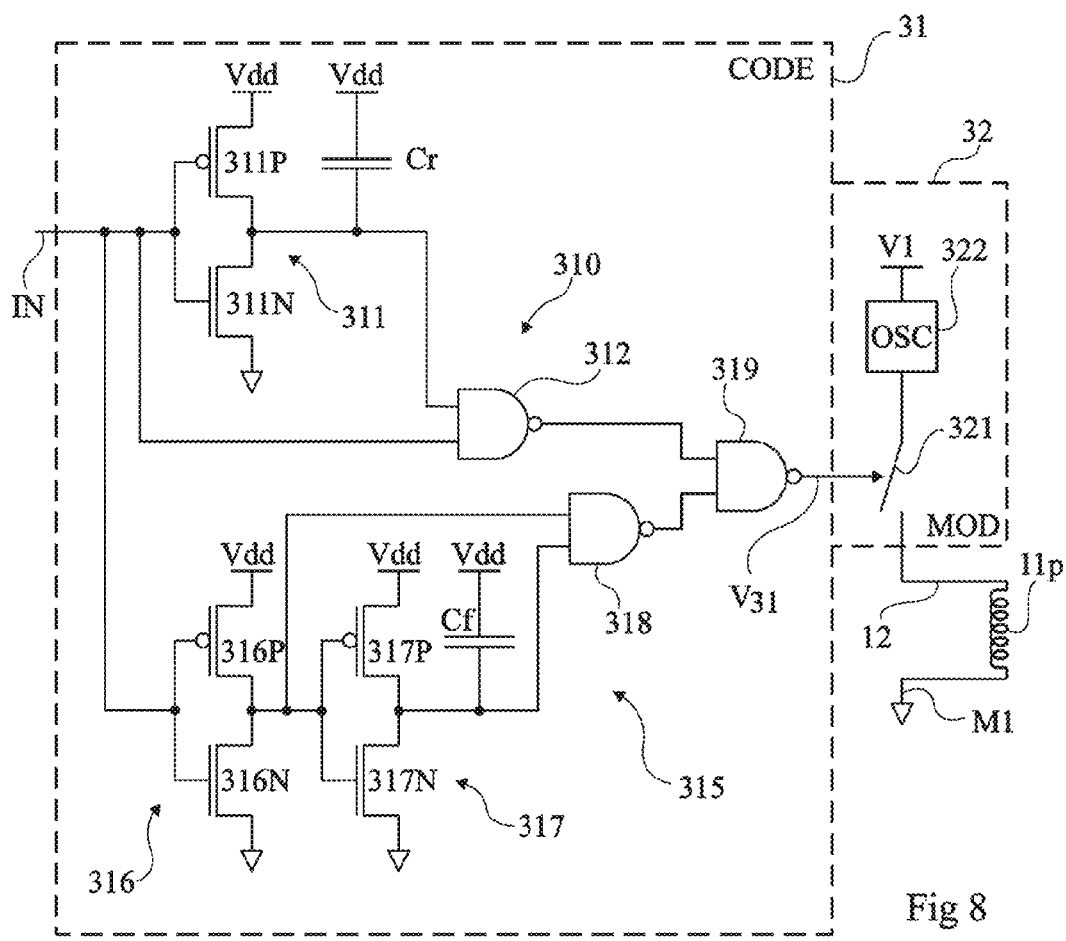
FIG. 8 shows an embodiment of an input circuit of the system of FIG. 6.

FIG. 8 shows an example of an input circuit of a system such as shown in FIG. 6.

Encoder 31 comprises a circuit 310 for generating pulses Pr on rising edges of input signal Vin and a circuit 315 for generating pulses Pf on falling edges. Circuit 310 comprises an inverter 311 (for example, a CMOS inverter formed of a pair of P-channel and N-channel transistors 311P and 311N) having its input connected to input IN and having its output connected to a first input of a logic NAND-type gate 312 having a second input connected to input IN. A capacitive element Cr connects the output of inverter 311 to the high supply voltage (for example, a voltage Vdd identical or not to voltage V1). Circuit 315 comprises two inverters 316 and 317 (for example, two CMOS inverters each formed of a pair of P-channel transistors 316P or 317P and N-channel transistors 316N or 317N) in series between input IN and a first input of a logic NAND-type gate 318 having a second end connected to the output of first inverter 316. A capacitive element Cf connects the output of inverter 317 to voltage Vdd. The outputs of gates 312 and 318 are combined by a NAND-type gate which provides signal V31.

The values of capacitive elements Cr and Cf are different from each other so that the durations of pulses Pr and Pf are different. The output of gate 312 switches to the low state on occurrence of a rising edge of signal Vin (its two inputs being in the high state) and remains therein until the discharge of element Cr in transistor 311N (in the on state as long as signal Vin is in the high state) is sufficient for the switching of gate 312. The output of gate 318 remains high for the entire duration when signal Vin is in the high state. On occurrence of a falling edge of signal Vin, the output of gate 318 switches to the low state (its two inputs being in the high state) and remains there until the discharge of element Cf in transistor 317N (in the on state as long as signal Vin is in the low state) is sufficient for the switching of gate 318. Gate 319 combines the pulses generated by gates 312 and 318 by inverting them.

Signal V31 controls a switch 321 interposed between an output of an oscillator 322 providing the modulation carrier and terminal 12 of winding 11p.

Figure 9:
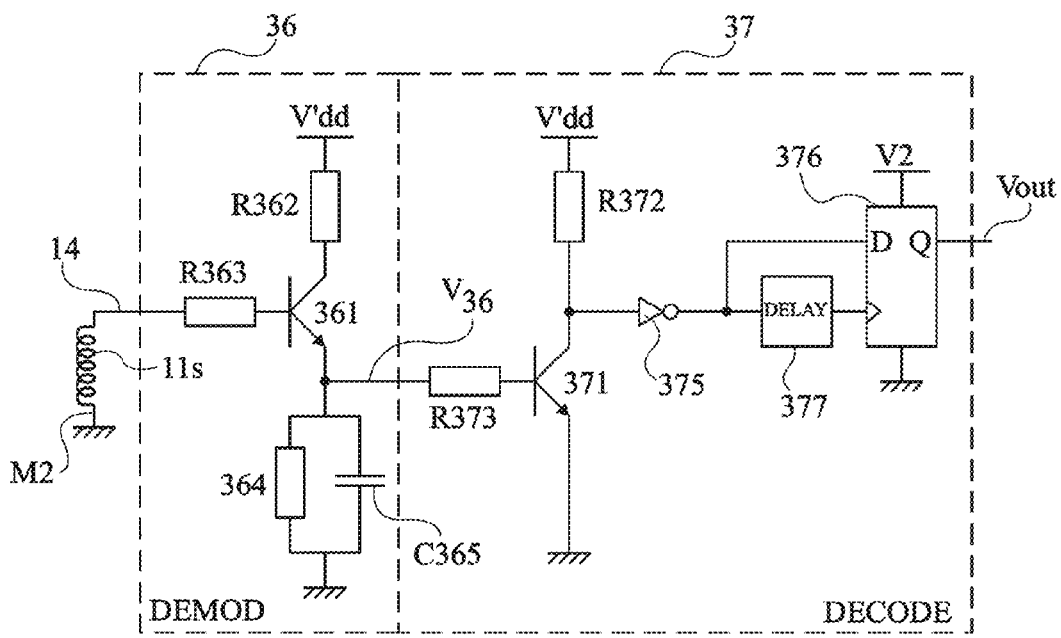
FIG. 9 shows an example of an output circuit of the system of FIG. 6.

FIG. 9 shows an exemplary embodiment of an output circuit on the secondary side of the system of FIG. 6.

Demodulator 36 comprises a transistor 361 (for example, an NPN-type bipolar transistor) having its collector connected by a biasing resistor R362 to a terminal of application of a high supply voltage V'dd (identical or not to voltage V2) and having its base connected, by a voltage-to-current conversion resistor R363, to terminal 14. The emitter of transistor 361 is connected to ground M2 by a resistor R364 in parallel with a capacitive element C365. Capacitive element C365 is selected so that the time constant that it generates with resistor R364 enables recovering the modulation envelope. The emitter of transistor 361 provides signal V36 and is connected, by a resistor R372, to the base of a setting transistor 371 (for example, an NPN-type bipolar transistor) having its emitter connected to ground and having its collector connected, by a resistor R372, to the terminal of application of voltage V'dd. The collector of transistor 371, which forms the output of the setting stage, is connected to the input of an inverter 375 having its output connected on the one hand to the D data input of a D-type flip-flop 376 and on the other hand, via a delay circuit 377 (DELAY), to the clock input of this flip-flop 376. The Q output of flip-flop 376 provides signal Vout. The delay introduced by element 377 is selected to range between the durations of pulses P'r and P'f of signal V36, to ensure a time overlapping of the output signals of input 375 and of delay element 377 during the longest pulse P'r (or P'f) or no overlapping during the shortest pulse P'f (or P'r).

FIG. 10 shows another exemplary embodiment of an input circuit (coder+modulator) of the system shown in FIG. 6.

FIGS. 11A to 11H are time diagrams illustrating the operation of the coder of FIG. 10. FIG. 11A represents an example of signal IN to be transmitted. FIGS. 11B to 11G represent corresponding shapes in several nodes of the coder. FIG. 11H represents the pulse signal (Pr, Pf) of different durations according to the rising or falling edge of the signal to be transmitted. In this example, the longer duration is associated with falling edges.

The signal IN (FIG. 11A) to be transmitted passes through a coder 31' for separating the rising edges from the falling edges and for generating pulses of different durations according to these edges. Signal V31 (FIG. 11H) comprising pulses Pr and Pf of a first duration (T) for the rising edges of signal IN and of a second duration (2T) for the falling edges of the signal IN is for example used to control a modulator 32 of the type of the modulator of FIG. 8.

In coder 31', a logic gate 41 of the XOR type receives the signal IN on a first input and on a second input a signal V42 (FIG. 11B) provided by a delay element 42 (delay) receiving as input signal IN. The output of gate 41 provides a signal V41 (FIGS. 11 and 11C) and is connected to respective first inputs of two AND type logic gates 43 and 44. The signal V41 comprises pulses at each rising edge of signal IN. The second respective inputs of gates 43 and 44 receive the signal IN inverted by an inverter 45. Consequently, the output signal V43 (FIG. 11D) of the gate 43 comprises a pulse at each rising edge of the signal IN, and the output signal V44 (FIG. 11F) of the gate 44 comprises a pulse at each falling edge of this signal IN. The respective outputs of gates 43 and 44 are processed by pulse generators 46 and 47 of respective duration T and 2T. Any type of pulse generator of a given duration can be used. The respective outputs V46 (FIG. 11E) and V47 (FIG. 11G) of generators 46 and 47 are combined by an OR type logic gate 48 the output of which provides signal V31 (FIG. 11H).

Of course, the present invention is likely to have various alterations, modifications, and improvements which will readily occur to those skilled in the art. In particular, the selection of the frequency and of the durations to be used depends on the application and on the possible structures of the input and output circuits. Other embodiments of input and output circuits can be used, as long as they respect the provision of an input signal for the primary windings having pulses of a first length for the rising edges and of a second length for the falling edges. Further, although the present invention has been described in relation with positive signals with respect to the grounds, the inverse is, of course, possible by adapting the different circuits.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of communicating a digital signal from a first circuit to a second circuit, the first circuit being electrically coupled to the second circuit via a transformer, the transformer comprising a primary winding and a secondary winding, the primary winding being electrically connected to the first circuit and the secondary winding being electrically connected to the second circuit, the method comprising:
   transferring the digital signal from the first circuit to the second circuit through the transformer, wherein transferring the digital signal comprises applying to the primary winding of the transformer a frequency-modulated signal, the frequency-modulated signal including one or more first sinusoidal trains of a first duration corresponding to a rising edge of the digital signal and one or more second sinusoidal trains of a second duration corresponding to a falling edge of the digital signal.

2. The method of claim 1, further comprising:
   creating the frequency-modulated signal based on the digital signal to be transferred, the frequency-modulated signal having a frequency, wherein creating the frequency-modulated signal comprises:
      in response to detecting a rising edge in the digital signal, adding to the frequency-modulated signal a sinusoidal train having the first duration and having the frequency, and
      in response to detecting a falling edge in the digital signal, adding to the frequency-modulated signal a sinusoidal train having the second duration and having the frequency.

3. The method of claim 2, further comprising:
   selecting a modulation carrier having the frequency of the frequency-modulated signal such that a period of the modulation carrier is shorter than first duration of the one or more first sinusoidal trains and the second duration of the one or more second sinusoidal trains.

4. The method of claim 1, further comprising:
   demodulating a second frequency-modulated signal of sinusoidal trains received by the second circuit electrically connected to the secondary winding of the transformer to recover an envelope of the frequency-modulated signal comprising the one or more first sinusoidal trains of the first duration and the one or more second sinusoidal trains of the second duration; and
   decoding, with the second circuit, the demodulated signal to restore the digital signal.

5. The method of claim 4, further comprising:
   prior to the demodulating, filtering the second frequency-modulated signal, received by the second circuit electrically connected to the secondary winding of the transformer, by means of a low-pass filter.

6. The method of claim 1, further comprising creating the frequency-modulated digital signal at least in part by:
   converting a rising edge of the digital signal into a first pulse having a constant voltage for a first length of time that is the first duration;
   converting a falling edge of the digital signal into a second pulse, having the constant voltage for a second length of time that is the second duration, the second length of time being different from the first length of time;
   frequency-modulating the first and second pulses using a carrier, the carrier having a period shorter than the first length of time and the second length of time.

7. The method of claim 6, further comprising:
   demodulating a signal sampled from the secondary winding of the transformer to recover a pulse envelope; and
   decoding the demodulated signal to restore the digital signal by interpreting respective durations of pulses restored by the demodulation.

8. The method of claim 7, further comprising:
   prior to the demodulating, filtering the signal sampled from the secondary winding of the transformer by means of a band-pass filter having a passband including the frequency of the carrier.

9. The method of claim 1, wherein each sinusoidal train of the one or more first sinusoidal trains of the first duration and the one or more second sinusoidal trains of the second duration has a same frequency.

10. The method of claim 1, wherein the transformer is arranged such that the primary winding inductively couples to the second winding during operation of the transformer.

* * * * *